Patented July 3, 1951

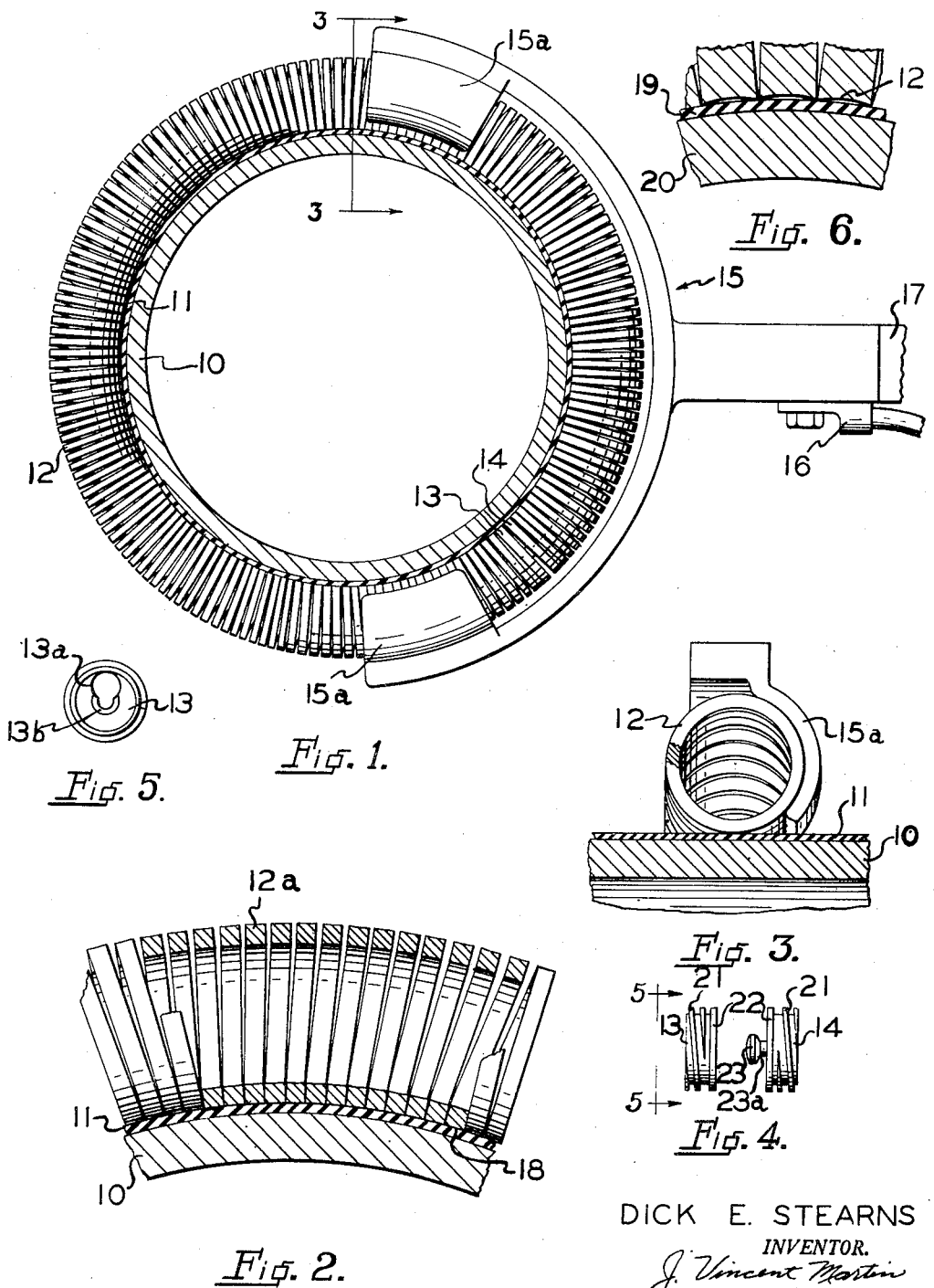

2,558,883

UNITED STATES PATENT OFFICE 2,558,883

INSULATION TESTING DEVICE

Dick E. Stearns, Shreveport, La.

Application March 17, 1947, Serial No. 735,259

5 Claims. (Cl. 175—183)

This invention relates to improvements in insulation testing devices and refers more particularly to such devices having exploring electrodes for electrically testing insulation coatings on members having substantially circular cross section as for example pipelines.

At the present time many pipelines are formed from materials such as iron or steel which corrode badly when buried underground, the corrosion often resulting in breaks, leaks or the like. A principal cause of this corrosion is electrolysis due to the effect of electrical currents flowing naturally in the earth. Insulation coatings have been widely and successfully used as one method of protecting pipelines against corrosion due to electrolysis.

Defects or flaws in the insulation coating destroy the effectiveness of the protection provided by such coatings and the corrosion of the portions of the pipelines exposed by such defects or flaws actually proceeds at a greater rate than if no coating were provided. This is probably due to the fact that more current per unit of area will actually flow through the exposed part of the pipeline, than if the coating were not present so that this current would be applied over greater areas of the pipeline.

Testing devices, adapted to detect such flaws or defects, have been used before such as those disclosed in my earlier U. S. Patent 2,332,182, issued October 19, 1943. This invention relates to improvements in such devices so as to provide more sensitive detectors for such flaws. The improvements also permit the employment of a reduced testing potential over that employed according to my earlier patent.

An object of this invention is to provide a device for uniformly subjecting an insulating coating to a test potential.

Another object is to provide an insulation testing device wherein the electrode has a substantially continuous contact with the insulation coating of a pipeline about the entire circumference of the coating as it is moved therealong.

A further object is to provide an insulation device wherein there is substantially no tendency for the electrode of the device to mar or track the insulation coating.

Still another object is to provide an improved electrode for use in devices of the character described.

Other and further objects of this invention will appear from the following description:

In the accompanying drawings which form a part of the instant specification and are to be read in conjunction therewith, and wherein like reference numerals are used to designate like parts in the various views;

Fig. 1 is a sectional view through a pipeline having an insulating coating and showing in elevation an electrode and other parts of a testing device embodying this invention;

Fig. 2 is a fragmentary sectional view, on an enlarged scale, of a portion of the electrode and insulated pipeline shown in Fig. 1;

Fig. 3 is a view on an enlarged scale taken along the line 3—3 in Fig. 1 in the direction of the arrows;

Fig. 4 is an exploded side elevation of the fastener elements used to join together the ends of the coiled spring shown in Fig. 1;

Fig. 5 is a view taken along the line 5—5 in Fig. 4 in the direction of the arrows; and Fig. 6 is a fragmentary sectional view illustrating a part of an electrode according to this invention as it engages an insulation coating having greater diameter than does the coating as shown in Fig. 1.

Referring to the drawings, the numeral 10 designates a pipeline or other elongated object to be protected by an insulating coating. The insulating coating is shown at 11 and completely encases the member 10.

The testing device includes a coiled spring 12 having its ends joined together by fastener elements 13 and 14. The coiled spring provides the electrode which circumferentially surrounds the insulating coating 11. The other of the test electrodes is provided by the protected member 10 itself as member 10 is connected by a suitable lead not shown in the drawing to a source of electrical energy not shown.

Electrode 12 is propelled along member 10 in a rolling movement by any suitable device, an example of which is shown at 15. This device is shown in the form of a yoke the arms of which carry electrode engaging elements 15a. The end of the yoke has an electrical connection 16 with a conductor having a connection with a source of electrical energy not shown in the drawings. The yoke itself is formed of electrically conductive material but has an insulated handle 17 extending from the yoke end.

The electrode engaging elements 15a rotatably engage electrode 12 to propel it along insulating coating 11. In as much as the electrode is connected to the same source of energy as is member 10, a potential is provided across the insulating coating. Thus, if any flaws or defects are encountered in the coating, a flow of current will occur between the electrode and member 10. Suitable indicating devices and circuits are employed but not shown in the drawings in the interest of simplicity. Thus, the flow of current through the circuit indicates the occurrence of a defect in the insulating coating.

Referring now to the electrode 12, it is seen that the electrode provides a substantially continuous contact surface about the circumference of the insulating coating 11. Heretofore in devices of this character coiled spring electrodes have been formed of wire round in cross section and each coil has a contact with the insulating coating only at a single point which for practical purposes may be considered a point of tangency. When using coiled springs of this character instead of a substantially continuous contact between the electrode and the insulating coating there is provided a circle of contact consisting of a series of small spaced apart engagements or contact. The gaps between the coils and the periphery of the coating provide a materially increased electrical resistance. This necessitates the use of a higher potential in the inspection circuit and even then flaws of a minute character have been frequently passed over without detection.

In the instant invention, the spring electrode is formed in such manner that the contact surface between the electrode and the coating to be tested is a substantially continuous line as indicated in Fig. 2 at 18. This effect may be accomplished by forming the coiled spring from wire having a substantially flat surface. The spring is wound in such fashion that the flat surface of the wire provides the outer periphery of the electrode. Preferably wire having a square cross section is employed as it is available commercially on the market. It has been found that in forming the spring from square type wire the stresses set up in the wire itself, when the coil is wound, distort the outer surface of each of the loops so that in cross section the outer edge is arcuate (slightly concave) as shown in Fig. 2 at 12a. This slightly curved surface, when the ends of the spring are joined together, forms at the inner periphery of the spring a substantially continuous contact surface 18 which for practical purposes is of a circular configuration corresponding substantially to the configuration of the peripheral surface of the coating to be tested.

In Fig. 6 there is shown on an enlarged scale a modification. The outer diameter of the insulating coating 19, which is to be tested, is much greater than that of the coating 11 as the pipe 20 to be protected has a larger diameter than pipe 10. In this case the contact surface of each loop of the coil is concave as heretofore pointed out and the radius upon which the arc is struck is less than that of the coating 19. Thus each loop has a contact with the periphery of the coating adjacent each side of the loop and the center portion of the loop is somewhat spaced from the periphery of the coating. This gap is shown in Fig. 6 in a somewhat exaggerated scale to better illustrate the invention. However, in practice this gap is negligible even when the coating to be tested is relatively hard, for the curve of the contact surface of the coil loops is very slight, the contact line of each loop being substantially straight for practical purposes. When softer insulating coatings are tested, which is usually the case, this gap is usually entirely eliminated and yet the coating is not materially marred or tracked by the spring as it passes over the coating due to the very slight concave character of the contact surface of the coil loops.

It is also pointed out that due to the added strength of wire having a square cross section as compared to circular cross section wire the width dimension of any face of the square type wire may be less than the diameter of the circular type wire. Thus, in the instance of the slightly arcuate face of the outer surface of each coil loop not conforming exactly to the configuration of the coating tested, as is shown in Fig. 6, the actual points of contact between the coil loops and the coating will be of greater number than where electrodes formed of circular type wire are used.

It is contemplated that in some instances it may be desirable to have wire drawn through special dies to provide a wire having other than square diameter, but in which the surface which will form the outer periphery of the coiled spring will be substantially but not quite flat. Thus, the arcuate character of the contact surface of each loop may be adjusted in this manner to conform more nearly to the contour of a coating to be tested than is the case where exact square cross section wire is used.

In winding the springs a close wound spring is provided whereby when the ends of the spring are joined together adjacent loops are placed in abutment at their inner or contact surface. A spring of this character is placed under some stress when its ends are joined together with its axis assuming a substantially circular configuration, as this effects some elongation of its axis as compared to a position of rest of the spring laying in a straight horizontal position. Due to this characteristic the length of the spring electrode can be adjusted so that the spring just fits about the coating to be tested with its ends releasably secured together. The axis of the spring is not lengthened in addition to that effected by the joining together of the ends of the springs. This places sufficient stress on the electrode to prevent it from sagging at the bottom and adjacent loops will be in abutment along the electrode contact surface 18 eliminating gaps which would otherwise prevail along the contact line. Springs of this type have a theoretical unstressed length that is less than the actual length of the spring. These springs are actually under some stress even when lying at rest with their axis extending in substantially a straight line. Preferably the theoretical unstressed lengths of the coiled spring should be but slightly less than the actual length and may be of the same length as this provides an electrode that will not subject the tested coating to excessive stresses.

Suitable fastening means for securing together the ends of the spring is detailed in Figs. 4 and 5. This means includes the elements 13 and 14. Each element is provided with special helical threads 21 which threadedly receive the loops adjacent the end of the spring. The width of the threads 21 preferably are kept to a minimum that will provide the requisite strength and also are of a depth so that their outer surface will substantially conform to the outer periphery of the loops of the spring which they receive whereby the threads provide a part of the contact surface which in operation engages the coating to be tested. The elements may be secured by solder or otherwise to the spring ends. Each of the elements also has an end flange 22. The outer periphery of these flanges correspond to that of each of the coils and also form a part of the contact surface of the electrode.

The latching means between the elements comprise a keyhole slot 13a in the end face of element 13 and a pin 23 having an enlarged head at its end. The inner surface 23a of the head is formed as a segment of a sphere and is adapted to fit in the spherical socket 13b formed centrally of the inner face of element 13. Thus, when the pin is inserted in the enlarged part of slot 13a head 23a is then seated in socket 13b and the stress of the spring retains the head in place in the socket, preventing accidental release of the latch. Also, the length of pin 23 provides for abutment of flanges 22 of elements 13 and 14 along the contact surface of the electrode as the electrode is rolled along the insulating coating.

It will be seen that the objects of the invention have been accomplished. There has been provided an insulation testing device wherein the insulating coating is uniformly subjected to a test potential about its circumference. The construction is such that the electrode has substantially a continuous contact surface for engaging the periphery of an insulating coating. The arrangement is such that the electrode may be readily rolled along the coating to be tested with little tendency to mar or track the insulation coating. The electrode of the invention may be readily and economically fabricated and placed on or removed from the tubular coating to be tested, providing a device of great utility for testing protective coatings for pipelines and the like.

From the foregoing it will be seen that this invention is one well adapted to attain all of the ends and objects herein above set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described my invention, I claim:

1. An electrode for use in conjunction with apparatus for testing tubular shaped insulation comprising a coiled spring of electrically conductive material, said spring formed of wire having one substantially flat side which forms the outer periphery of the spring when wound and means for connecting the ends of the electrode together whereby it may encircle the insulation to be tested and be rolled therealong in snug contact therewith.

2. An electrode for use in conjunction with apparatus for testing tubular shaped insulation comprising a coiled spring of electrically conductive material, said spring formed of wire square shaped in cross section, one of the flat sides of the wire providing the outer periphery of the spring and means for connecting the ends of the electrode together whereby it may encircle the insulation to be tested and be rolled therealong in snug contact therewith.

3. An electrode for use in conjunction with apparatus for testing tubular shaped insulation comprising a coiled spring of electrically conductive material, each loop of the coil, in cross section, having arcuate (concave) outer edges struck on a radius substantially the same as the radius of the outer surface of the insulation to be tested and means for connecting the ends of the electrode together whereby it may encircle the insulation to be tested and be rolled therealong in snug contact therewith.

4. An electrode for use in conjunction with apparatus for testing tubular shaped insulation comprising a coiled spring of electrically conductive material, said spring formed of wire having one substantially flat side which forms the outer periphery of the spring when wound, said spring formed in such manner that the axis of the coil is lengthened somewhat to place the spring under stress when the coil is moved from a position of rest, wherein its axis extends in a substantially straight line, to a position with the coil ends joined together and the axis placed in substantially a circular configuration.

5. An electrode for use in conjunction with apparatus for testing tubular shaped insulation comprising a coiled spring of electrically conductive material, said spring formed of wire having one substantially flat side which forms the outer periphery of the spring when wound, said spring having a theoretical unstressed length slightly less than the actual length of the spring lying at rest with its axis extending in substantially a straight line.

DICK E. STEARNS.

REFERENCES CITED

The following references are of record in the file of this patent:

UNITED STATES PATENTS

| Number | Name | Date |
| --- | --- | --- |
| 477,525 | Ferrell | June 21, 1892 |
| 917,401 | Barnholdt | Apr. 6, 1909 |
| 996,997 | Morris | July 4, 1911 |
| 1,501,382 | Whisler | July 15, 1924 |
| 1,991,777 | Vaughn | Feb. 19, 1935 |
| 2,332,182 | Stearns | Oct. 19, 1942 |

FOREIGN PATENTS

| Number | Country | Date |
| --- | --- | --- |
| 14,985 | Great Britain | Nov. 3, 1887 |
| 591,054 | France | June 27, 1925 |